United States Patent
Yang et al.

(10) Patent No.: US 10,675,701 B2
(45) Date of Patent: Jun. 9, 2020

(54) METHOD AND APPARATUS FOR RESISTANCE SPOT WELDING OVERLAPPING STEEL WORKPIECES

(71) Applicant: GM Global Technology Operations LLC, Detroit, MI (US)

(72) Inventors: David Yang, Shanghai (CN); Wu Tao, Tianmen (CN); Qi Lu, Shanghai (CN); Blair E Carlson, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 15/638,699

(22) Filed: Jun. 30, 2017

(65) Prior Publication Data

US 2019/0001428 A1    Jan. 3, 2019

(51) Int. Cl.
*B23K 11/11* (2006.01)
*B23K 11/16* (2006.01)
*B23K 11/36* (2006.01)
*B32B 15/01* (2006.01)

(52) U.S. Cl.
CPC .......... *B23K 11/115* (2013.01); *B23K 11/166* (2013.01); *B23K 11/364* (2013.01); *B32B 15/011* (2013.01)

(58) Field of Classification Search
CPC ... B23K 11/115; B23K 11/364; B23K 11/166; B23K 11/20; B23K 11/3009; B23K 11/185; B23K 35/0261; B23K 2203/20

USPC ......................................................... 219/119
See application file for complete search history.

(56) References Cited

U.S. PATENT DOCUMENTS

| | | | |
|---|---|---|---|
| 2014/0124485 A1* | 5/2014 | Tseng | B23K 11/002 219/117.1 |
| 2014/0305912 A1* | 10/2014 | Taniguchi | B23K 11/24 219/91.22 |
| 2015/0352659 A1* | 12/2015 | Sigler | B23K 11/115 219/91.2 |
| 2016/0346865 A1* | 12/2016 | Sigler | B23K 11/115 |

* cited by examiner

*Primary Examiner* — Brian W Jennison
(74) *Attorney, Agent, or Firm* — Reising Ethington P.C.

(57) ABSTRACT

A method of resistance spot welding a workpiece stack-up comprising overlapping first and second steel workpieces is disclosed, wherein at least one of the steel workpieces comprises an advanced high-strength steel substrate. The workpiece stack-up is positioned between a pair of opposed first and second welding electrodes. A cover is disposed between at least one of the first steel workpiece and the first welding electrode or the second steel workpiece and the second welding electrode at an intended weld site. The workpiece stack-up is clamped between the first and second welding electrodes at the weld site such that at least one of the weld faces of the first and second welding electrodes presses against the cover. The first and second steel workpieces are welded together by passing an electrical current between the first and second welding electrodes at the weld site.

20 Claims, 5 Drawing Sheets

METHOD AND APPARATUS FOR RESISTANCE SPOT WELDING OVERLAPPING STEEL WORKPIECES

TECHNICAL FIELD

The present disclosure relates to resistance spot welding and, more specifically, to resistance spot welding of steel workpieces.

INTRODUCTION

Automotive vehicle bodies are assembled by joining together prefabricated metal workpieces. The metal workpieces are typically formed by stamping sheets of metal into the shape of specific vehicle components, such as roofs, doors, hoods, trunk lids, lift gates, body panels, and/or cross-members. The metal workpieces are typically made of steel or aluminum and are joined together using resistance spot welding. Corrosion resistance may be imparted to steel workpieces by applying a layer of zinc to at least one of their major surfaces. The layer(s) of zinc may be applied by an electro-galvanizing, galvannealing, or hot-dip galvanizing process, wherein the steel workpieces are immersed in a bath of molten zinc.

Resistance spot welding, as applicable in the context of steel-to-steel spot welding, relies on the resistance to the flow of an electrical current through overlapping steel workpieces and across their faying interface(s) to generate heat. To carry out such a welding process, a pair of opposed spot welding electrodes is typically clamped against aligned spots on opposite sides of a workpiece stack-up, which typically includes two or three steel workpieces arranged in a lapped configuration. Electrical current is then passed through the steel workpieces from one welding electrode to the other. Resistance to the flow of this electrical current generates heat within the steel workpieces and at their faying interface(s). The generated heat creates a molten weld pool that grows to consume the faying interface(s) and thus extends through all or part of each of the stacked steel workpieces. Upon termination of the passage of electrical current through the workpiece stack-up, the molten weld pool solidifies into a weld nugget that fusion welds the adjacent steel workpieces together.

Advanced high-strength steels exhibit a combination of high mechanical strength and ductility (formability), and thus are promising materials for use in the manufacture of automotive vehicle bodies. However, the effective use of advanced high-strength steels in the manufacture of automotive vehicle bodies is limited by their ability to be spot-welded, which has been found to present challenges. The desirability of spot welding advanced high-strength steel is not unique to the automotive industry; indeed, it extends to other industries that may utilize spot welding as a joining process, including the aviation, maritime, railway, and building construction industries, among others.

SUMMARY

A method of resistance spot welding overlapping steel workpieces is provided. A workpiece stack-up comprising a first steel workpiece and a second steel workpiece are provided that overlap each other at an intended weld site. The first steel workpiece has an exterior outer surface that provides a first side of the workpiece stack-up and the second steel workpiece has an exterior outer surface that provides a second side of the workpiece stack-up. The workpiece stack-up is positioned between a pair of opposed first and second welding electrodes such that a weld face of the first welding electrode faces toward the first side of the workpiece stack-up and a weld face of the second welding electrode faces toward the second side of the workpiece stack-up. At least one of the first and second steel workpieces comprises an advanced high-strength steel substrate. The advanced high-strength steel substrate may have an ultimate tensile strength of greater than 550 MPa and a microstructure that includes greater than 5 vol % austenite, martensite, or bainite at ambient temperature. A cover is disposed between at least one of the first steel workpiece and the first welding electrode or the second steel workpiece and the second welding electrode at the weld site. The workpiece stack-up is clamped between the first and second welding electrodes at the weld site such that at least one of the weld faces of the first and second welding electrodes presses against the cover. The first and second steel workpieces are welded together by passing an electrical current between the first and second welding electrodes at the weld site.

In one form, the first steel workpiece may comprise an advanced high-strength steel substrate having an ultimate tensile strength of greater than 550 MPa and a microstructure that includes greater than 5 vol % austenite, martensite, or bainite at ambient temperature. In such case, the cover may be disposed between the first steel workpiece and the first welding electrode at the weld site and the workpiece stack-up may be clamped between the first and second welding electrodes at the weld site such that the weld face of the first welding electrode presses against the cover.

In another form, the second steel workpiece may comprise an advanced high-strength steel substrate having an ultimate tensile strength of greater than 550 MPa and a microstructure that includes greater than 5 vol % austenite, martensite, or bainite at ambient temperature. In such case, the cover may be disposed between the second steel workpiece and the second welding electrode at the weld site and the workpiece stack-up may be clamped between the first and second welding electrodes at the weld site such that the weld face of the second welding electrode presses against the cover.

In yet another form, both the first and second steel workpieces may comprise an advanced high-strength steel substrate having an ultimate tensile strength of greater than 550 MPa and a microstructure that includes greater than 5 vol % austenite, martensite, or bainite at ambient temperature. In such case, a first cover may be disposed between the first steel workpiece and the first welding electrode and a second cover may be disposed between the second steel workpiece and the second welding electrode at the weld site. In addition, the workpiece stack-up may be clamped between the first and second welding electrodes at the weld site such that the weld face of the first welding electrode presses against the first cover and the weld face of the second welding electrode presses against the second cover.

The advanced high-strength steel substrate may have a surface coating that comprises a metal or metal alloy having a relatively low melting point, as compared to that of the advanced high-strength steel substrate. In one form, the surface coating may comprise zinc or a zinc-based alloy.

The advanced high-strength steel substrate may comprise a complex phase (CP), ferritic-bainitic (FB), martensitic (MS), hot formed (HF), press hardened (PHS), quenching and partitioning (Q&P), transformation induced plasticity (TRIP) steels, or twinning induced plasticity (TWIP) steel. In one form, the advanced high-strength steel substrate may comprise 3-100 vol % austenite at ambient temperature. In one form, the advanced high-strength steel substrate may have an ultimate tensile strength greater than 780 MPa.

The cover may comprise an iron alloy having an ultimate tensile strength less than that of the advanced high-strength steel substrate. In one form, the cover may exhibit a microstructure that includes less than 5 vol % austenite at ambient temperature. For example, the microstructure of the cover at ambient temperature may consist of ferrite or a combination of ferrite and pearlite. The cover may have a thickness less than that of the first and second steel workpieces.

In one form, the cover may be disposed between at least one of the first steel workpiece and the first welding electrode or the second steel workpiece and the second welding electrode at the weld site by depositing a layer of a ferrous material on at least one of the exterior outer surface of the first steel workpiece or the exterior outer surface of the second steel workpiece. In another form, the cover may be inserted between at least one of the first steel workpiece and the first welding electrode or the second steel workpiece and the second welding electrode at the weld site prior to clamping the workpiece stack-up between the first and second welding electrodes. After the cover is inserted between at least one of the first steel workpiece and the first welding electrode or the second steel workpiece and the second welding electrode at the weld site, an end portion of the cover may be severed from a remaining portion of the cover. In one form, the end portion of the cover may be severed from the remaining portion of the cover along a perforated seam.

A faying interface is established between each pair of adjacent overlapping steel workpieces within the workpiece stack-up at the weld site. In one form, the workpiece stack-up may consist of the first and second steel workpieces and a single faying interface may be established within the workpiece stack-up at the weld site. In another form, the workpiece stack-up may include a third steel workpiece disposed between the first and second steel workpieces. In such case, the third steel workpiece may have two opposed faying surfaces, with one of the faying surfaces of the third steel workpiece overlapping and contacting a faying surface of the first steel workpiece and the other faying surface of the third steel workpiece overlapping and contacting a faying surface of the second steel workpiece such that two faying interfaces are established within the workpiece stack-up.

DETAILED DESCRIPTION

Improved methods of resistance spot welding advanced high-strength steel (AHSS) workpieces are disclosed in which a cover is disposed between a surface of an AHSS workpiece and a weld face of an adjacent welding electrode at an intended weld site prior to welding the AHSS workpiece to one or more overlapping steel workpieces in a workpiece stack-up. The cover physically separates the AHSS workpiece from the weld face of the welding electrode at the weld site and reduces the magnitude of residual stresses imparted to the AHSS workpiece at the weld site during the welding process, which may improve the strength of a resulting spot-welded joint formed between the overlapping steel workpieces in the workpiece stack-up. The cover may, for example, reduce the magnitude of residual stresses imparted to the AHSS workpiece at the weld site by absorbing and diffusing at least some of the force exerted on the workpiece stack-up by the weld face of the welding electrode.

Figure 1:
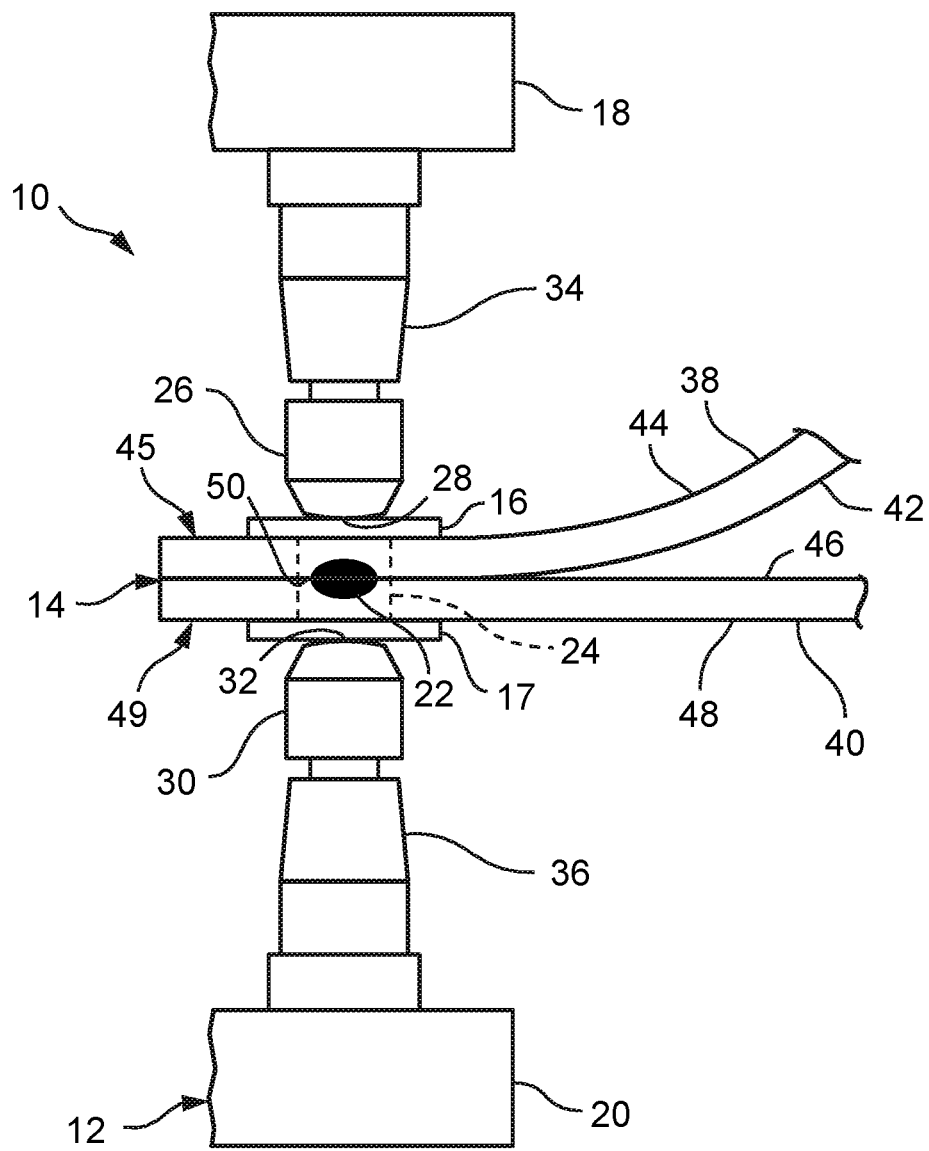
FIG. 1 is a side view of a resistance spot welding assembly that includes a pair of opposed first and second welding electrodes in preparation for spot welding a workpiece stack-up that includes a first steel workpiece and an overlapping adjacent second steel workpiece, wherein a first cover is disposed between the first welding electrode and the first steel workpiece and a second cover is disposed between the second welding electrode and the second steel workpiece.

FIG. 1 illustrates a resistance spot welding assembly 10 that can be used to carry out the presently disclosed resistance spot welding methods. The assembly 10 includes a weld gun 12, a workpiece stack-up 14, and first and second covers 16, 17 disposed on opposite sides of the workpiece stack-up 14, between the weld gun 12 and the workpiece stack-up 14.

The weld gun 12 includes a first gun arm 18 and a second gun arm 20 that are moveable relative to each other and are configured to form a weld joint 22 at an intended weld site 24 within the workpiece stack-up 14. A first welding electrode 26 having a first weld face 28 is carried by the first gun arm 18 and a second welding electrode 30 having a second weld face 32 is carried by the second gun arm 20. The first welding electrode 26 may be secured to the first gun arm 18 by a first electrode holder 34 and the second welding electrode 30 may be secured to the second gun arm 20 by a second electrode holder 36. The first and second welding electrodes 26, 30 are preferably made of an electrically conductive material, such as copper or a copper alloy.

The workpiece stack-up 14 includes a first steel workpiece 38 and a second steel workpiece 40 that are stacked-up and positioned between the first and second welding electrodes 26, 30 in preparation for formation of the weld joint 22. In this arrangement, the first steel workpiece 38 includes a faying surface 42 and an exterior outer surface 44 that provides a first side 45 of the workpiece stack-up 14, and the second steel workpiece 40 includes a faying surface 46 and an exterior outer surface 48 that provides a second side 49 of the workpiece stack-up 14. The faying surfaces 42, 46 of the first and second steel workpieces 38, 40 overlap and contact one another to establish a single faying interface 50 within the workpiece stack-up 14 at the weld site 24. The exterior outer surfaces 44, 48 of the first and second steel workpieces 38, 40 generally face away from each other in opposite directions.

Figure 2:
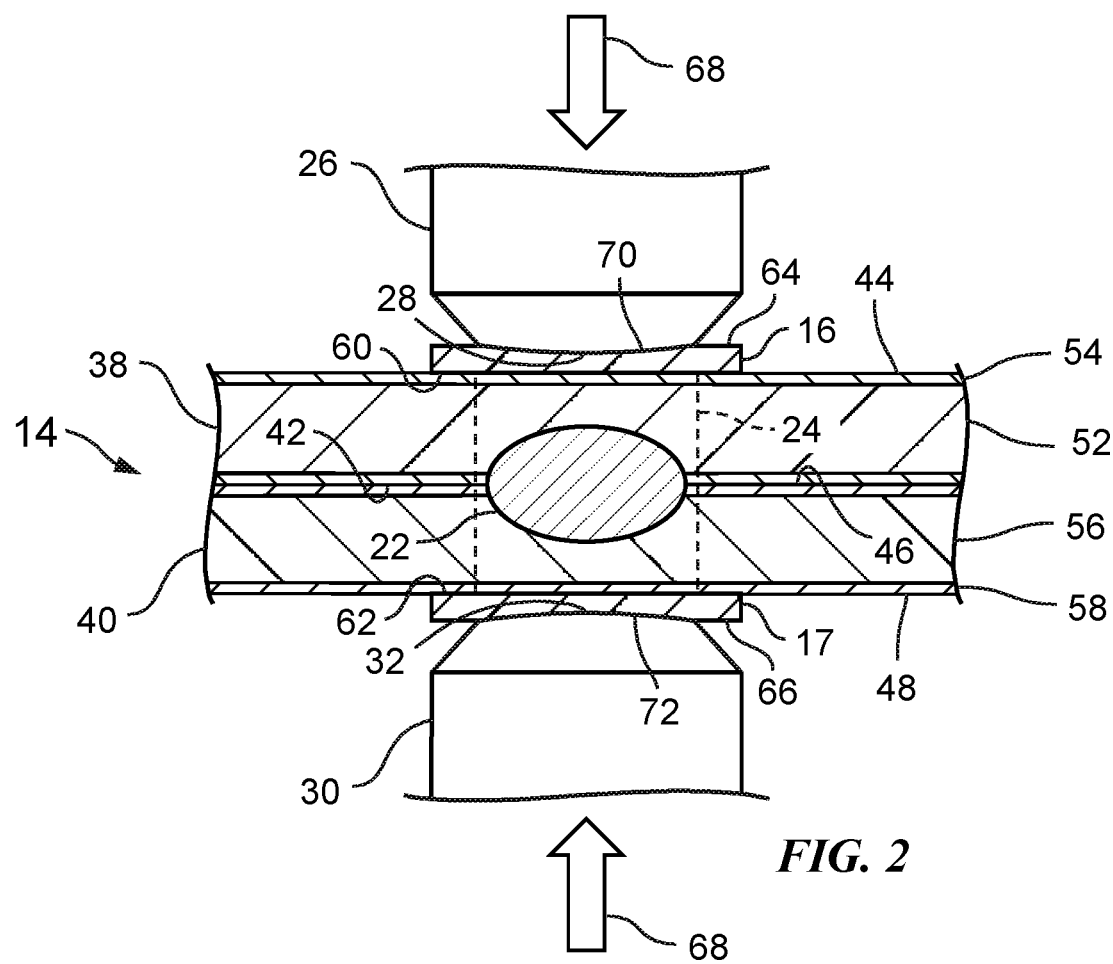
FIG. 2 is a magnified cross-sectional view of the workpiece stack-up of FIG. 1, wherein the workpiece stack-up and the first and second covers are clamped between the opposed first and second welding electrodes.

As best shown in FIG. 2, the first steel workpiece 38 includes a steel substrate 52 having a surface coating 54 on one or both sides (as shown) of the steel substrate 52 and the second steel workpiece 40 includes a steel substrate 56 having a surface coating 58 on one or both sides (as shown) of the steel substrate 56. In one form, both sides of one or both of the steel substrates 52, 56 may be uncoated. When present, the surface coatings 54, 58 may comprise a metal or metal alloy having a relatively low melting point, as compared to the melting point of the corresponding steel substrate 52, 56 on which the coatings 54, 58 are formed. In one form, the surface coatings 54, 58 may comprise zinc or a zinc alloy having a melting point less than 420° C. In another form, the surface coatings 54, 58 may comprise aluminum or an aluminum alloy having a melting point of about 660° C. or less. The steel substrates 52, 56 may be processed and shaped in any desirable manner.

At least one of the steel substrates 52, 56 comprises an advanced high-strength steel. As used herein, the term "advanced high-strength steel" means an iron alloy having an ultimate tensile strength of greater than 550 MPa and a microstructure that includes greater than 5 vol % of at least one of the following phases at ambient temperature (20° C.): austenite (or retained austenite), martensite, or bainite. In one form, the advanced high-strength steel may exhibit an ultimate tensile strength of greater than 780 MPa. In one form, the advanced high-strength steel may comprise an austenite phase at ambient temperature in an amount of 3-100 vol %, or more specifically, in an amount of 5-40 vol %. Other phases that also may be present in the microstructure of the advanced high-strength steel include ferrite, pearlite, and/or cementite. The advanced high-strength steel may include one or more alloying elements, such as carbon (C), manganese (Mn), chromium (Cr), molybdenum (Mo), vanadium (V), niobium (Nb), nickel (Ni), silicon (Si), phosphorus (P), aluminum (Al), nitrogen (N), boron (B), and combinations thereof. The microstructure and resulting mechanical properties of the advanced high-strength steel may be achieved by controlling the type and amount of alloying elements and by controlling the rate at which the steel is cooled during processing. For example, the advanced high-strength steel may be hot-formed (e.g., hot-rolled) or heat treated post-forming (e.g., continuously annealed cold-rolled or hot-dip coated).

Some specific types of advanced high-strength steels that may be used to form at least one of the steel substrates 52, 56 include: complex phase (CP), ferritic-bainitic (FB), martensitic (MS or MART), hot formed (HF), press hardened (PHS), quenching and partitioning (Q&P), transformation induced plasticity (TRIP) steels, and twinning induced plasticity (TWIP) steels. Complex phase steels may exhibit an ultimate tensile strength of greater than 700 MPa, elongation at fracture in the range of 10-40%, and a microstructure at ambient temperature that includes relatively small amounts of martensite, austenite, and pearlite within a ferrite/bainite matrix. For example, complex phase and ferritic-bainitic steels may comprise 5-30 vol % austenite at ambient temperature. Martensitic steels may exhibit an ultimate tensile strength of greater than 800 MPa, elongation at fracture in the range of 1-15%, and a microstructure at ambient temperature characterized by a martensitic matrix containing small amounts of ferrite and/or bainite. Martensitic, hot formed, and press hardened steels typically exhibit elongation at fracture of less than 10% and a fully martensitic microstructure (e.g., greater than 95 vol % martensite) at ambient temperature, but also may comprise 0.5-10 vol % austenite. TWIP steels typically exhibit an ultimate tensile strength of greater than 800 MPa, elongation at fracture in the range of 50-70%, and a fully austenitic microstructure at ambient temperature (e.g., greater than 95 vol % austenite).

Figure 3:
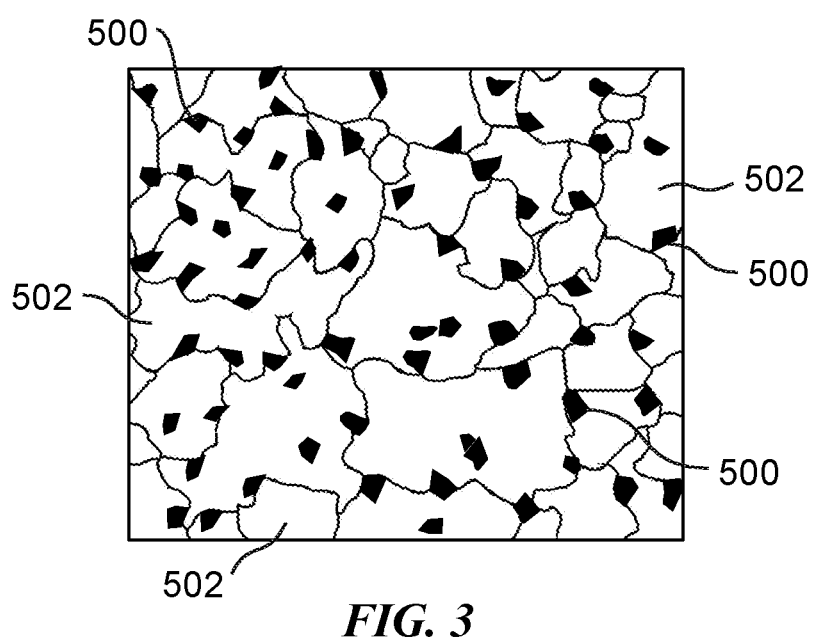
FIG. 3 is a schematic illustration of the microstructure of an example of a transformation induced plasticity (TRIP) steel that includes an austenite phase (γ-Fe) distributed through a matrix phase of ferrite (α-Fe)

Referring now to FIG. 3, in one form, at least one of the steel substrates 52, 56 may comprise a transformation-induced plasticity (TRIP) steel, which may exhibit an ultimate tensile strength of greater than 600 MPa and elongation at fracture of 10-40%. In one form, the TRIP steel may exhibit an ultimate tensile strength of greater than 900 MPa and elongation at fracture of greater than 20%. The TRIP steel may exhibit a microstructure at ambient temperature that primarily includes an austenite phase ($\gamma$-Fe) 500 distributed through a matrix phase of ferrite ($\alpha$-Fe) 502. At ambient temperature, the austenite phase 500 may account for 10-50 vol % of the TRIP steel and the ferrite phase 502 may account for 50-90 vol % of the TRIP steel. In one specific example, the TRIP steel may comprise 20-40 vol % austenite and 60-80 vol % ferrite at room temperature. Additional phases of bainite and/or martensite also may be present in the microstructure of TRIP steel in relatively small amounts. One specific TRIP steel that may be used to form at least one of the steel substrates 52, 56 may comprise a medium manganese (Mn)-TRIP steel, which may include 4-12 wt % manganese (Mn).

The presence of an austenite phase in certain advanced high-strength steels is believed to be responsible for their ability to achieve a combination of high mechanical strength and ductility. Without intended to be bound by theory, it is believed that during plastic deformation of austenitic steels, the austenite phase in the steel microstructure progressively transforms to martensite with increasing strain (strain induced martensite transformation), which provides the steel with excellent ductility (formability). This phenomenon is commonly referred to as the transformation-induced plasticity effect.

In another form, at least one of the steel substrates 52, 56 may comprise a quenching and partitioning (Q&P) steel, which may exhibit an ultimate tensile strength of greater than 900 MPa and elongation at fracture in the range of 10-30%. The Q&P steel may exhibit a microstructure at ambient temperature including phases of ferrite, martensite, and austenite. In one form, the Q&P steel may comprise 30-50 vol % ferrite, 40-60 vol % martensite, and >0 vol % to 20 vol % austenite and at ambient temperature. In yet another form, at least one of the steel substrates 52, 56 may comprise a TRIP-assisted bainitic-ferritic steel (TBF), which may exhibit an ultimate tensile strength of greater than 800 MPa and elongation at fracture in the range of 10-30%. The TBF steel may exhibit a microstructure at ambient temperature including phases of ferrite, bainite, martensite, and/or austenite. In one form, the TBF steel may comprise 0-20 vol % ferrite, 50-60 vol % bainite, 0-10 vol % martensite, and 10-20 vol % austenite and at ambient temperature. In yet another form, at least one of the steel substrates 52, 56 may comprise a delta-TRIP steel (δ-TRIP), which may exhibit an ultimate tensile strength of greater than 600 MPa and elongation at fracture in the range of 20-40%. The δ-TRIP steel may exhibit a microstructure at ambient temperature including phases of ferrite, martensite, bainite, and/or austenite. In one form, the δ-TRIP steel may comprise 10-60 vol % ferrite, 0-40 vol % martensite, 0-30 vol % bainite, and >0-30 vol % austenite and at ambient temperature.

Taking into account the thickness of the steel substrates 52, 56 and the surface coatings 54, 58, each of the first and second steel workpieces 38, 40 may have a thickness in the range of 0.3 mm to 6.0 mm at the weld site 24. In one form, each of the first and second steel workpieces 38, 40 may have a thickness in the range of 0.6 mm to 2.5 mm, or more specifically, in the range of 0.5 mm to 2 mm, at least at the weld site 24. In one form, one or both of the first and second steel workpieces 38, 40 may be galvanized or galvannealed, and the surface coatings 54, 58 may comprise zinc or a zinc alloy. In such case, the surface coatings 54, 58 may have thicknesses in the range of 2-100 μm, or more specifically, in the range of 20-100 μm.

The first and second covers 16, 17 have respective inner surfaces 60, 62 and outer surfaces 64, 66 and are disposed on opposite sides of the workpiece stack-up 14 at the location of the intended weld site 24. In particular, the first cover 16 is positioned between the first welding electrode 26 and the first steel workpiece 38 such that the inner surface 60 of the first cover 16 faces toward the exterior outer surface 44 of the first steel workpiece 38 and the outer surface 64 of the first cover 16 faces toward the first weld face 28 of the first welding electrode 26. In addition, the second cover 17 is positioned between the second welding electrode 30 and the second steel workpiece 40 such that the inner surface 62 of the second cover 17 faces toward the exterior outer surface 48 of the second steel workpiece 40 and the outer surface 66 of the second cover 17 faces toward the second weld face 32 of the second welding electrode 30.

The first and second covers 16, 17 may be made of a relatively soft ferrous material, as compared to that of the first and second steel workpieces 38, 40. For example, the first and second covers 16, 17 may comprise an iron alloy (steel) having an ultimate tensile strength less than that of the first and second steel workpieces 38, 40. In one form, the first and second covers 16, 17 may comprise an iron alloy (steel) having an ultimate tensile strength of less than 500 MPa. Some specific types of steel that may be used to form the first and second steel workpieces 38, 40 include low carbon (or mild), interstitial-free (IF), bake hardenable (BH), carbon-manganese (CM), and high-strength low-alloy (HSLA) steels. These steels may exhibit a single-phase ferrite microstructure at ambient temperature or a combination of ferrite and pearlite. In one form, the first and second covers 16, 17 may comprise steel having a microstructure that includes less than 5 vol % of austenite, martensite, and/or bainite at ambient temperature, or more specifically, less than 2 vol % of austenite, martensite, and/or bainite at ambient temperature.

The shape of the first and second covers 16, 17, as defined by their inner and outer surfaces 60, 62, 64, 66, may vary and may be designed to accommodate the shape of the first and second steel workpieces 338, 340 and/or the weld faces 28, 32 of the welding electrodes 26, 30, for example. For example, the first and second covers 16, 17 may be generally rectangular, circular, annular, or donut-like in shape with an open center and may have regular or irregularly shaped outer peripheries. In addition, the inner and outer surfaces 60, 62, 64, 66 of the first and second covers 16, 17 may be generally flat or the surfaces 60, 62, 64, 66 may be contoured and may be configured to conform to the contours of the outer surfaces 44, 48 of the first and second steel workpieces 338, 340 and/or the weld faces 28, 32 of the welding electrodes 26, 30, for example.

The thickness of each of the first and second covers 16, 17, measured between their respective inner and outer surfaces 60, 62, 64, 66, may be less than the thickness of either of the first or second steel workpieces 38, 40. For example, the thickness of each of the first and second covers 16, 17 may be in the range of 0.01 mm to 1.5 mm at the weld site 24. In one form, each of the first and second covers 16, 17 may have a thickness in the range of 0.2 mm to 0.7 mm at the weld site 24. The surface area on the exterior outer surfaces 44, 48 of the first and second steel workpieces 38, 40 covered by the first and second covers 16, 17 is sufficient to span the full extent of the weld faces 28, 32 and may be equal to or less than the surface area of the exterior outer surfaces 44, 48 of the first and second steel workpieces 38, 40. For example, the surface area of the inner and outer surfaces 60, 62, 64, 66 of the first and second covers 16, 17 may be greater than or equal to the surface area of the first and second weld faces 28, 32. In one form, the ratio of the surface area of any one of the inner and outer surfaces 60, 62, 64, 66 of the first and second covers 16, 17 to the surface area of the first or second weld face 28, 32 may be in the range of 2:1 to 10:1.

In preparation for and during resistance spot welding, the workpiece stack-up 14 is positioned between the first and second welding electrodes 26, 30 such that the weld site 24 is positioned between the axially and facially aligned first and second weld faces 28, 32 of the first and second welding electrodes 26, 30. The workpiece stack-up 14 may be brought to a location between the first and second welding electrodes 26, 30, for example, in situations where the gun arms 18, 20 are part of a stationary pedestal welder. Or, the gun arms 18, 20 may be robotically moved to locate the electrodes 26, 30 relative to the weld site 24. The covers 16, 17 may be inserted between the first and second steel workpieces 38, 40 and the first and second welding electrodes 26, 30 by several different mechanisms. In some cases, the manner in which the covers 16, 17 are inserted between the steel workpieces 38, 40 and the welding electrodes 26, 30 may depend upon the design and construction of the welding gun arms 18, 20, the weld gun 12, or the larger resistance spot welding assembly 10.

Once the workpiece stack-up 14 is properly positioned, the first and second steel workpieces 38, 40 and the first and second covers 16, 17 are clamped together by the weld gun 12 at the weld site 24 such that the first weld face 28 of the first welding electrode 26 presses against the outer surface 64 of the first cover 16 and the second weld face 32 of the second welding electrode 30 presses against the outer surface 66 of the second cover 17. A clamping force 68 is directly applied to the outer surfaces 64, 66 of the first and second covers 16, 17 and is indirectly applied to the opposite first and second sides 45, 49 (surfaces 44, 48) of the workpiece stack-up 14 through the first and second covers 16, 17. The clamping force 68 may range, for example, from 1 kN to 10 kN, or more narrowly, from 2 kN to 5 kN. The clamping force 68 applied to the first and second covers 16, 17 by the axially and facially aligned first and second weld faces 28, 32 may be sufficient to form respective indentations 70, 72 in the first and second covers 16, 17. In one form, such indentations 70, 72 may extend from the outer surfaces 64, 66 of the first and second covers 16, 17 at a depth in the range of 0.1 mm to 0.25 mm.

While the first and second steel workpieces 38, 40 are clamped together, an electrical current is passed between the axially and facially aligned weld faces 28, 32 of the first and second welding electrodes 26, 30 and through the workpiece stack-up 14 at the weld site 24. Resistance to the flow of electrical current through the first and second steel workpieces 38, 40 and across the faying interface 50 generates heat that creates a molten weld pool (not shown) within the first and second steel workpieces 38, 40 at the faying interface 50 between the first and second steel workpieces 38, 40. The molten weld pool grows during the welding process and penetrates into each of the steel workpieces 38, 40 from their original faying surfaces 42, 46. In some situations, the molten weld pool also may penetrate into the first cover 16 and/or the second cover 17 from the exterior outer surfaces 44, 48 of the first and second steel workpieces 38, 40. The surface coatings 54, 58 may have relatively low melting and boiling points, as compared to the melting and boiling points of the steel substrates 52, 56, and thus may melt and/or vaporize within the vicinity of the weld site 24 during the welding process. Once passage of the electrical current stops, the molten weld pool is rapidly quenched and begins to solidify, with the heat contained in the molten weld pool dissipating into the surrounding steel and into the first and second welding electrodes 26, 30. After the molten weld pool is fully solidified, the solid weld joint 22 remains, which fuses the steel workpieces 38, 40 together at the weld site 24. In embodiments where the molten weld pool penetrates into the first and second covers 16, 17 as well as the first and second steel workpieces 38, 40 during the welding process, the resulting weld joint 22 will fuse the first and second covers 16, 17 and the first and second steel workpieces 38, 40 together at the weld site 24.

The first and second covers 16, 17 may improve the strength (tensile shear strength and cross tension strength) of the resulting weld joint 22 formed between the first and second steel workpieces 38, 40 (and optionally the first and second covers 16, 17) during the resistance spot welding process, as compared to the strength of a weld joint that would otherwise be formed if the covers 16, 17 were omitted. During conventional resistance spot welding of steel workpieces, which do not involve the use of the presently disclosed covers 16, 17, the exterior outer surfaces of the steel workpieces in a workpiece stack-up are placed in direct contact with the weld faces 28, 32 of the welding electrodes 26, 30 and thus are subjected to relatively high temperatures and pressures. Direct exposure to these high temperature and pressures has been found to produce residual stresses within the steel workpieces at the location of an intended weld site and in a zone surrounding the weld site, referred to as the heat-affected zone (HAZ). In turn, these residual stresses within the steel workpieces at the location of the weld site may result in the formation of local weakenings or crack initiation sites, which may grow and lead to eventual fracture of a resulting weld joint. In addition, without intending to be bound by theory, it is believed that, when one of the steel workpieces in the workpiece stack-up comprises an austenitic steel, the clamping force 68 applied to the exterior outer surface of the austenitic steel workpiece may cause the relatively ductile austenite phases in the workpiece to transform to the relatively hard and brittle martensite phase. This strain induced martensite transformation also may result in thermal expansion of the steel at the weld site and thus may impart additional amounts of residual stress to the steel at the location of the weld site, which may lead to the formation of a weld joint that is relatively brittle, as compared to that of the remaining portions of the steel workpieces. As a result, when the weld joint is subjected to standard cross tension and tensile shear testing, fracture may occur at relatively low loads across the weld joint in a plane parallel to the plane defined by a faying interface established between the workpieces (also known as interfacial failure).

A phenomenon known as liquid metal embrittlement (LME) also may occur at the location of the weld site when one or more of the steel workpieces in the workpiece stack-up includes a steel substrate having a surface coating of zinc, a zinc alloy, or another relatively low melting point metallic material. Without intending to be bound by theory, it is believed that, during resistance spot welding of coated steel workpieces, the relatively low melting point surface coatings may melt and travel in the liquid state into the microstructure of the steel substrates along the grain boundaries within the steel microstructure, which may cause grain boundary decohesion and, in some instances, undesirable surface cracks. The presence of an austenite phase within the steel workpieces has been found to increase the susceptibility of the steel workpieces to liquid metal embrittlement, which may present additional challenges for the resistance spot welding of advanced high-strength steels.

Without intended to be bound by theory, it is believed that the physical separation provided by the first and second covers 16, 17 between the first and second steel workpieces 38, 40 and the first and second welding electrodes 26, 30 may improve the strength of the resulting weld joint 22. In particular, it is believed that the first and second covers 16, 17 may absorb at least some of the clamping force 68 exerted on the workpiece stack-up 14 by the welding electrodes 26, 30 and also may distribute the clamping force 68 over a wider area on the exterior outer surfaces 44, 48 of the first and second workpieces 38, 40. In turn, this may reduce the amount of residual stress experienced at the location of the weld site 24 within the first and second workpieces 38, 40. In addition, it has been found that reducing the amount of residual stress at the location of the weld site 24 may inhibit strain induced martensite transformation as well as liquid metal embrittlement at the weld site 24, which may increase the cross tension strength and tensile shear strength of the resulting weld joint 22. And, because the covers 16, 17 do not comprise an advanced high-strength steel, the covers 16, 17 are not susceptible to these same challenges.

The workpiece stack-up 14 illustrated in FIGS. 1 and 2 includes a pair of adjacent, overlapping steel workpieces 38, 40 that are in direct contact with one another along their faying surfaces 42, 46 at the weld site 24. However, in other embodiments, the workpieces 38, 40 may be spaced apart from each other at the weld site 24, for example, by a layer of a weld-through adhesive or sealer (not shown). In one form, the workpiece stack-up 14 may include one or more additional metal workpieces disposed between the first and second steel workpieces 38, 40. The additional metal workpieces may or may not comprise advanced high-strength steel substrates and may be coated or uncoated.

Figure 4:
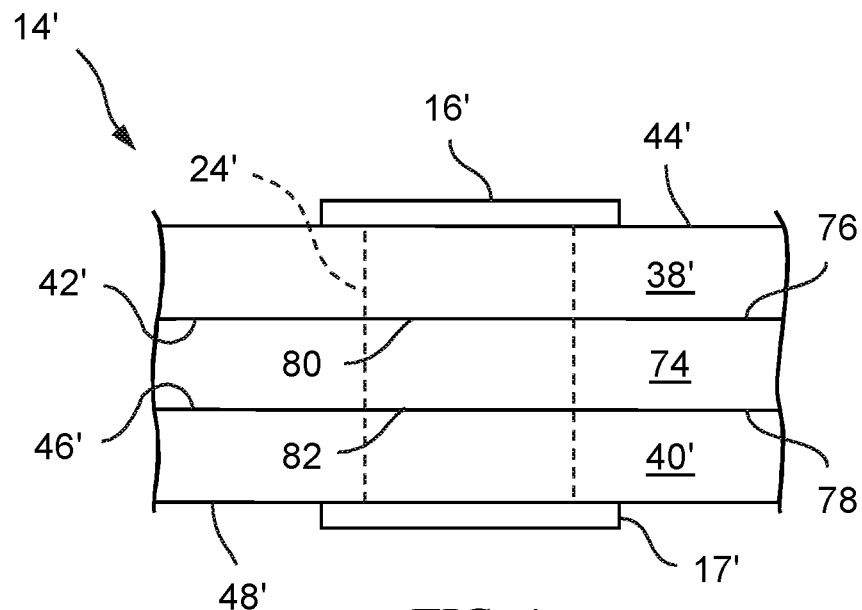
FIG. 4 is a schematic illustration of a workpiece stack-up that includes overlapping first, second, and third steel workpieces, with a first cover overlying a first side of the workpiece stack-up and a second cover overlying an opposite second side of the workpiece stack-up.

FIG. 4 illustrates another embodiment of a workpiece stack-up 14' that may be joined together by the presently disclosed resistance spot welding methods at an intended weld site 24'. The workpiece stack-up 14' includes a first steel workpiece 38', a second steel workpiece 40', and a third steel workpiece 74 that are stacked-up in preparation for resistance spot welding. In this overlapping arrangement, the first steel workpiece 38' includes a faying surface 42' and an exterior outer surface 44' that provides a first side of the workpiece stack-up 14' and the second steel workpiece 40' includes a faying surface 46' and an exterior outer surface 48' that provides a second side of the workpiece stack-up 14'. The exterior outer surfaces 44', 48' of the first and second steel workpieces 38', 40' generally face away from each other in opposite directions. The third steel workpiece 74 is positioned between the first and second steel workpieces 38', 40' and includes a first faying surface 76 and a second faying surface 78 that overlap and respectively contact the faying surfaces 42', 46' of the first and second steel workpieces 38', 40' to establish a first faying interface 80 and a second faying interface 82 within the workpiece stack-up 14' at the weld site 24'. A first cover 16' is located adjacent the first side of the workpiece stack-up 14' on the exterior outer surface 44' of the first steel workpiece 38' and a second cover 17' is located adjacent the second side of the workpiece stack-up 14' on the exterior outer surface 48' of the second steel workpiece 40'. The first, second, and third steel workpieces 38', 40', 74 may be joined together at the weld site 24' by clamping the workpieces 38', 40', 74 and the first and second covers 16', 17' between a pair of axially and facially aligned welding electrodes (not shown). Thereafter, an electrical current may be passed between the welding electrodes and through the workpiece stack-up 14' at the weld site 24' to form a molten weld pool (not shown) within the workpieces 38', 40', 74 that penetrates into each of the steel workpieces 38', 40', 74 and intersects each faying interface 80, 82 in the workpiece stack-up 14'. In some situations, the molten weld pool also may penetrate into the first cover 16' and/or the second cover 17' from the exterior outer surfaces 44', 48' of the first and second steel workpieces 38', 40'. Once passage of the electrical current stops, the molten weld pool is rapidly quenched and begins to solidify. After the molten weld pool is fully solidified, the solid weld nugget or joint remains, which fuses the steel workpieces 38', 40', 74 together at the weld site 24'. In embodiments where the molten weld pool penetrates into the first and second covers 16', 17' as well as the steel workpieces 38', 40', 74, the resulting weld joint also will fuse the first and second covers 16', 17' and the first, second, and third steel workpieces 38', 40', 74 together at the weld site 24'.

Figure 5:
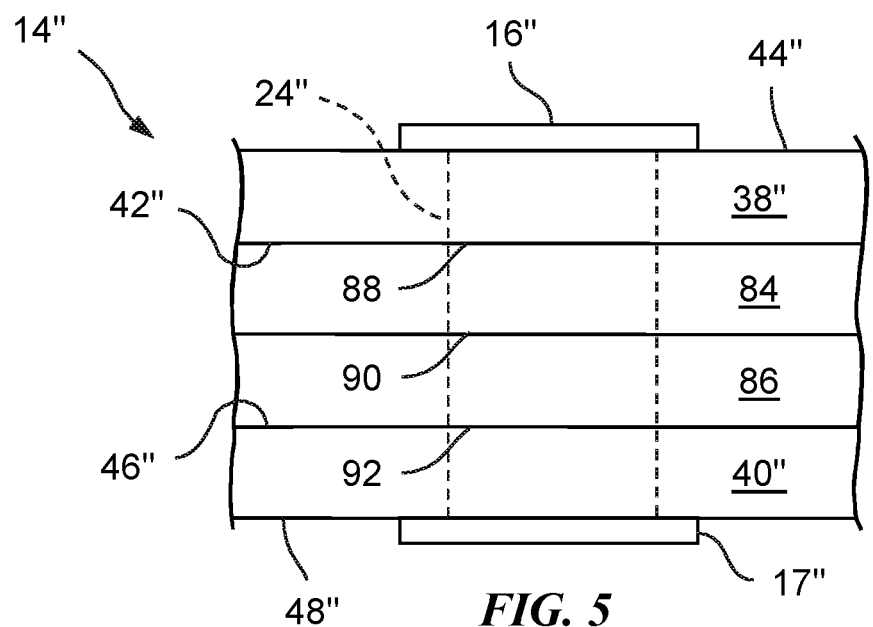
FIG. 5 is a schematic illustration of a workpiece stack-up that includes overlapping first, second, third, and fourth steel workpieces, with a first cover overlying a first side of the workpiece stack-up and a second cover overlying an opposite second side of the workpiece stack-up.

FIG. 5 illustrates another embodiment of a workpiece stack-up 14" that may suitably be welded together by the presently disclosed resistance spot welding methods. The workpiece stack-up 14" includes a first steel workpiece 38", a second steel workpiece 40", a third steel workpiece 84, and a fourth steel workpiece 86 that are stacked-up in preparation for resistance spot welding. In this overlapping arrangement, the first steel workpiece 38" includes a faying surface 42" and an exterior outer surface 44" that provides a first side of the workpiece stack-up 14" and the second steel workpiece 40" includes a faying surface 46" and an exterior outer surface 48" that provides a second side of the workpiece stack-up 14". The third and fourth steel workpieces 84, 86 are positioned between the first and second steel workpieces 38", 40" and such that a first faying interface 88, a second faying interface 90, and a third faying interface 92 are established within the workpiece stack-up 14" at an intended weld site 24". A first cover 16" is located adjacent the first side of the workpiece stack-up 14" on the exterior outer surface 44" of the first steel workpiece 38" and a second cover 17" is located adjacent the second side of the workpiece stack-up 14" on the exterior outer surface 48" of the second steel workpiece 40". The first, second, third, and fourth steel workpieces 38", 40", 84, 86 may be joined together at the weld site 24" by clamping the workpieces 38", 40", 84, 86 and the first and second covers 16", 17" between a pair of axially and facially aligned welding electrodes (not shown). Thereafter, an electrical current may be passed between the welding electrodes and through the workpiece stack-up 14" at the weld site 24" to form a molten weld pool (not shown) within the workpieces 38", 40", 84, 86 that penetrates into each of the steel workpieces 38", 40", 84, 86 and intersects each faying interface 88, 90, 92 in the workpiece stack-up 14". In some situations, the molten weld pool also may penetrate into the first cover 16" and/or the second cover 17" from the exterior outer surfaces 44", 48" of the first and second steel workpieces 38", 40". In such case, the resulting weld joint will fuse the first and second covers 16", 17" and the first, second, third, and fourth steel workpieces 38", 40", 84, 86 together at the weld site 24".

In the embodiments illustrated in FIGS. 1, 2, 4 and 5, one or both of the first and second steel workpieces 38, 40 may comprise an advanced high-strength steel substrate. As such, first and second covers 16, 17 may be disposed on both the first and second sides of the workpiece stack-up 14 prior to welding to reduce the amount of residual stress imparted to the first and second steel workpieces 38, 40 during the resistance spot welding process. However, in embodiments where one of the first or second steel workpieces 38, 40 does not comprise an advanced high-strength steel substrate, it may be unnecessary to include both a first cover and a second cover on opposite sides of the workpiece stack-up 14. For example, in embodiments where the first steel workpiece 38 comprises an advanced high-strength steel substrate, but the second steel workpiece 40 does not, the first cover 16 may be disposed over the exterior outer surface 44 of the first advanced high-strength steel workpiece 38 and the second cover 17 may be omitted.

Figure 6:
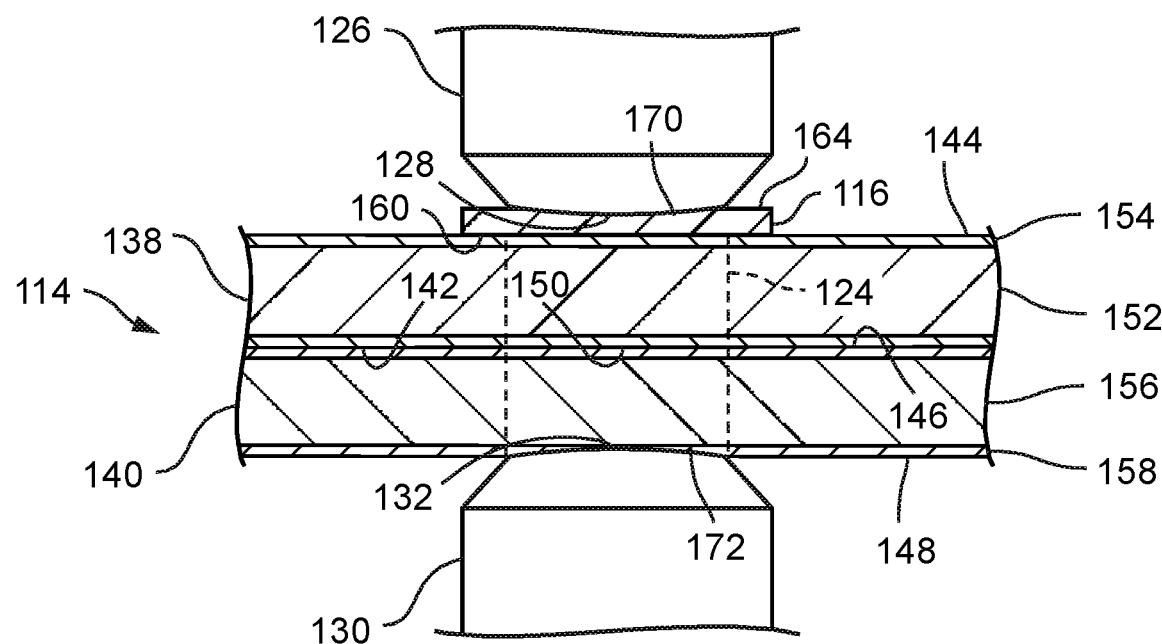
FIG. 6 is a cross-sectional view of a workpiece stack-up including a first steel workpiece and an overlapping adjacent second steel workpiece clamped between a pair of opposed first and second welding electrodes in preparation for spot welding, with a first cover disposed between the first welding electrode and the first steel workpiece.

Referring now to FIG. 6, in accordance with one or more embodiments of the present disclosure, a workpiece stack-up 114 may include a first steel workpiece 138 and a second steel workpiece 140 that are stacked-up and positioned between a first welding electrode 126 and a second welding electrode 130 in preparation for resistance spot welding. Like the embodiments illustrated in FIGS. 1, 2, 4 and 5, the first steel workpiece 138 includes a faying surface 142 and an exterior outer surface 144 that provides a first side of the workpiece stack-up 114, and the second steel workpiece 140 includes a faying surface 146 and an exterior outer surface 148 that provides a second side of the workpiece stack-up 114. The faying surfaces 142, 146 of the first and second steel workpieces 138, 140 overlap and contact one another to establish a faying interface 150 at an intended weld site 124. In addition, the first steel workpiece 138 includes a steel substrate 152 having a surface coating 154 on one or both sides (as shown) of the steel substrate 152 and the second steel workpiece 140 includes a steel substrate 156 having a surface coating 158 on one or both sides (as shown) of the steel substrate 156. The steel substrate 152 of the first steel workpiece 138 comprises an advanced high-strength steel, but the steel substrate 156 of the second steel workpiece 140 does not. As such, a cover 116 is disposed on the first side of the workpiece stack-up 114, between the first welding electrode 126 and the first steel workpiece 138, but an additional cover is not provided on the second side of the workpiece stack-up 114. In this arrangement, the cover 116 is positioned between the first welding electrode 126 and the first steel workpiece 138 such that an inner surface 160 of the cover 116 faces toward the exterior outer surface 144 of the first steel workpiece 138 and an outer surface 164 of the cover 116 faces toward a first weld face 128 of the first welding electrode 126.

In preparation for and during resistance spot welding of the workpiece stack-up 114, the first and second steel workpieces 138, 140 are clamped together at the weld site 124 and a clamping force (not shown) is applied to the opposite first and second sides of the workpiece stack-up 114. In particular, the first and second steel workpieces 138, 140 are clamped together at the weld site 124 by pressing the first weld face 128 of the first welding electrode 126 against the outer surface 164 of the cover 116 and pressing a second weld face 132 of the second welding electrode 130 against the exterior outer surface 148 of the second steel workpiece 140. The clamping force applied by the first and second weld faces 128, 132 may be sufficient to form respective indentations 170, 172 in the cover 116 and in the exterior outer surface 148 of the second steel workpiece 140. The first and second steel workpieces 138, 140 may be joined together by passing an electrical current between the axially aligned weld faces 128, 132 of the first and second welding electrodes 126, 130 and through the workpiece stack-up 114 at the weld site 124 to form a molten weld pool (not shown) within the first and second steel workpieces 138, 140 at the faying interface 150 between the first and second steel workpieces 138, 140. In some situations, the molten weld pool also may penetrate into the cover 116 from the exterior outer surface 144 of the first steel workpiece 138. After the molten weld pool is fully solidified, a solid weld joint will remain that fuses the steel workpieces 138, 140 together at the weld site 124. In embodiments where the molten weld pool penetrates into the cover 116 as well as the first and second steel workpieces 138, 140 during the welding process, the resulting weld joint will fuse the cover 116 and the first and second steel workpieces 138, 140 together at the weld site 124.

Figure 7:
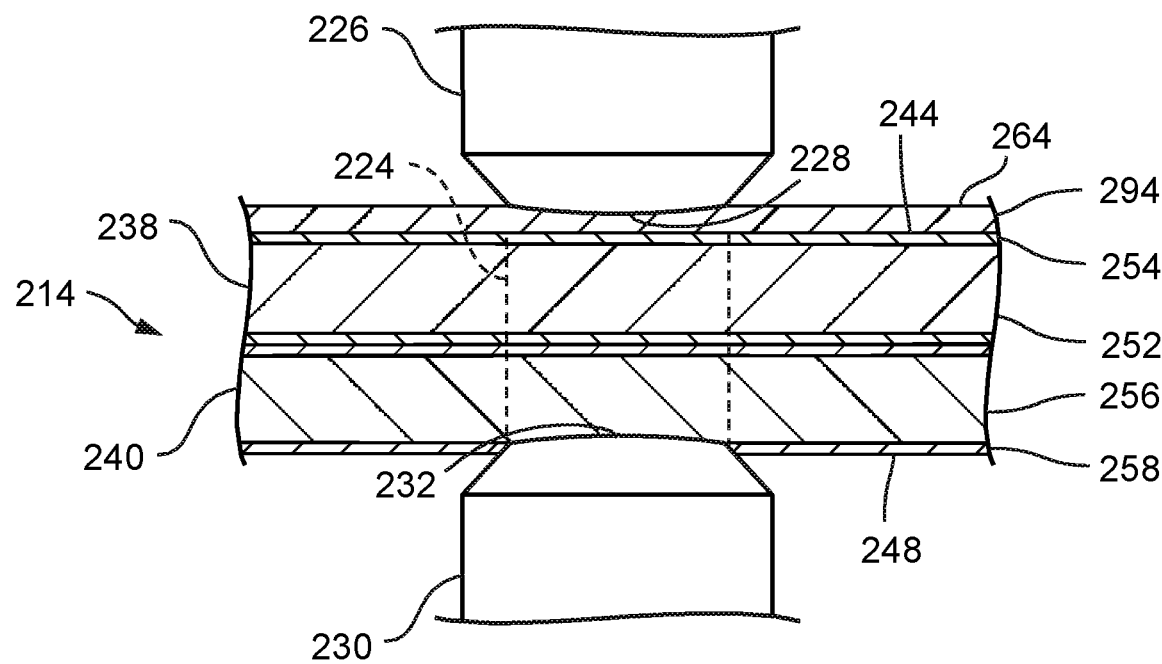
FIG. 7 is a cross-sectional view of a workpiece stack-up including a first steel workpiece and an overlapping adjacent second steel workpiece clamped between a pair of opposed first and second welding electrodes in preparation for spot welding, with a first cover overlying an exterior outer surface of the first steel workpiece.

Referring now to FIG. 7, in accordance with one or more embodiments of the present disclosure, a workpiece stack-up 214 may include a first steel workpiece 238 and a second steel workpiece 240 that are stacked-up and positioned between a first welding electrode 226 and a second welding electrode 230 at an intended weld site 224 in preparation for resistance spot welding. In this embodiment, the first steel workpiece 238 includes a cover 294 in the form of an overlying layer of material that is formed on an exterior outer surface 244 of the first steel workpiece 238 prior to positioning the workpiece stack-up 214 between the first welding electrode 226 and the second welding electrode 230. The cover 294 may have a thickness in the range of 20-100 μm at the weld site 24. In one form, the first steel workpiece 238 may include a steel substrate 252 made of an advanced high-strength steel and having a surface coating 254 on one or both sides (as shown) of the steel substrate 252. In another form, the cover 294 may be formed directly on the advanced high-strength steel substrate 252, on one or both sides of the substrate 252, and the surface coating 254 may be omitted (not shown). The second steel workpiece 240 also may include a steel substrate 256 having a surface coating 258 on one or both sides (as shown) of the steel substrate 256. In one form, the steel substrate 256 also may be made of an advanced high-strength steel and the second steel workpiece 240 also may include a cover (not shown) in the form of an overlying layer of material formed on an exterior outer surface 248 of the second steel workpiece 240. In another form, a cover in the form of an overlying layer of material may be formed directly on the steel substrate 256, on one or both sides of the substrate 256, and the surface coating 258 may be omitted (not shown).

The cover 294 may be formed on the exterior outer surface 244 of the first steel workpiece 238 and integrated therewith by any suitable method prior to assembly of the workpiece stack-up 214. For example, the cover 294 may be deposited or otherwise applied to the exterior outer surface 244 of the first steel workpiece 238 by a method that results in the formation of a chemical and/or mechanical bond between the cover 294 and the exterior outer surface 244 of the first steel workpiece 238. Some exemplary methods that may be used to form the cover 294 on the exterior outer surface 244 of the first steel workpiece 238 may include cladding (e.g., hot roll bonding, cold roll bonding, explosive bonding, centrifugal casting, brazing, weld overlaying, adhesive bonding, extrusion, and hot isostatic pressing) or thermal spray. In such case, the cover 294 may have a thickness in the range of 0.02 mm to 0.1 mm, at least at the weld site 224.

In preparation for and during resistance spot welding of the workpiece stack-up 214, the first and second steel workpieces 238, 240 are clamped together at the weld site 224 and a clamping force (not shown) is applied to the opposite first and second sides of the workpiece stack-up 214. In particular, the first and second steel workpieces 238, 240 are clamped together at the weld site 224 by pressing a first weld face 228 of the first welding electrode 226 against an exterior outer surface 264 of the cover 294 and pressing a second weld face 232 of the second welding electrode 230 against the exterior outer surface 248 of the second steel workpiece 240. Thereafter, the first and second steel workpieces 238, 240 may be joined together by passing an electrical current between the axially aligned weld faces 228, 232 of the first and second welding electrodes 226, 230 and through the workpiece stack-up 214 at the weld site 224 to form a molten weld pool (not shown) within the first and second steel workpieces 238, 240 at the faying interface 250 between the first and second steel workpieces 238, 240. In some situations, the molten weld pool also may penetrate into the cover 294 from the exterior outer surface 244 of the first steel workpiece 238.

Figure 8:
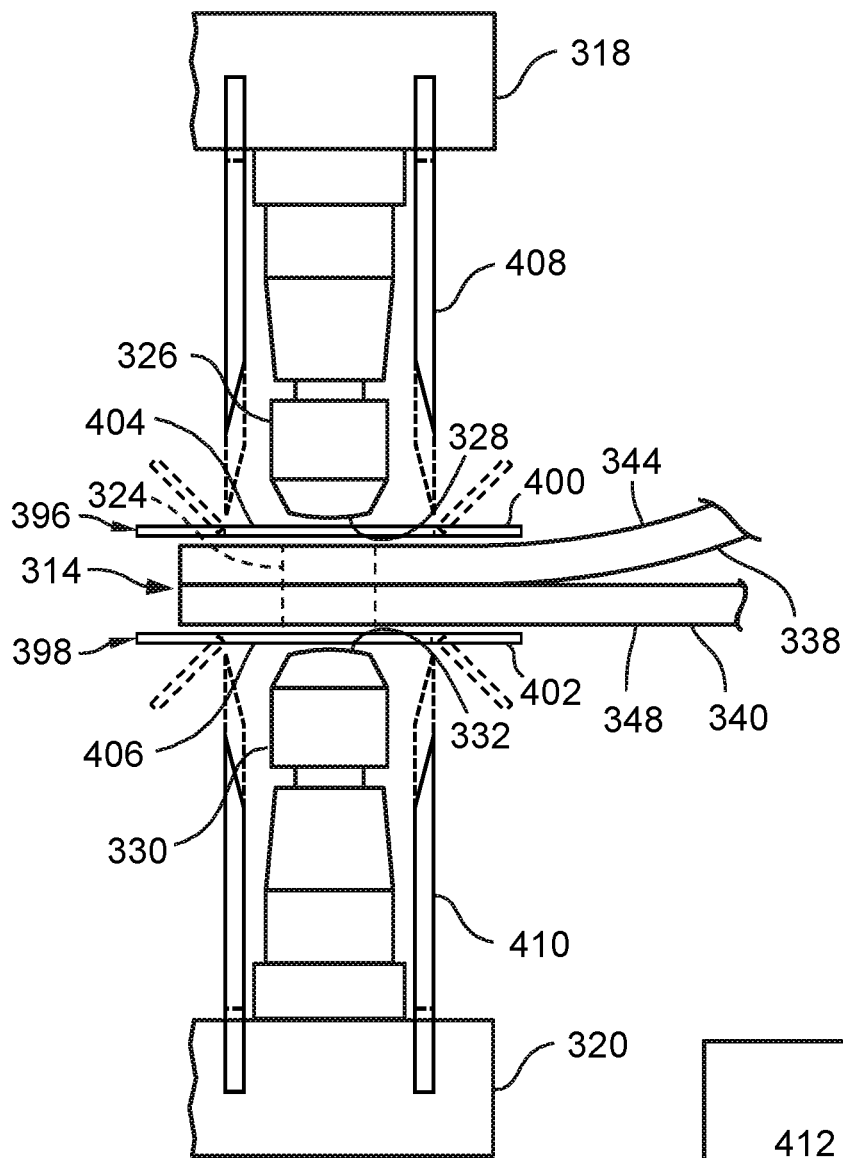
FIG. 8 is a side view of a resistance spot welding assembly that includes a pair of opposed first and second welding electrodes in preparation for spot welding a workpiece stack-up that includes a first steel workpiece and an overlapping adjacent second steel workpiece, wherein a first cover is inserted between the first welding electrode and the first steel workpiece and a second cover is disposed between the second welding electrode and the second steel workpiece.

Referring now to FIG. 8, in accordance with one or more embodiments of the present disclosure, a workpiece stack-up 314 including a first steel workpiece 338 and a second steel workpiece 340 may be positioned between a first welding electrode 326 carried by a first gun arm 318 and a second welding electrode 330 carried by a second gun arm 320 in preparation for forming a weld joint at an intended weld site 324. A first cover 396 in the form of a continuous or discontinuous ribbon is inserted between an exterior outer surface 344 of the first steel workpiece 338 and a weld face 328 of the first welding electrode 326 and a second cover 398 in the form of a continuous or discontinuous ribbon is inserted between an exterior outer surface 348 of the second steel workpiece 340 and a weld face 332 of the second welding electrode 330 at the weld site 324 prior to clamping the first and second steel workpieces 338, 340 between the first and second welding electrodes 326, 330. After the covers 396, 398 are inserted between the workpieces 338, 340 and the welding electrodes 326, 330, end portions 400, 402 of the covers 396, 398 may be severed adjacent the weld site 324 and discarded so that remaining portions 404, 406 of the covers 396, 398 exhibit a desired length and width and span the full extent of the weld faces 328, 332 at the weld site 324, as shown in FIG. 8. To facilitate severing, cutting members 408, 410 may be carried by the weld gun arms 318, 320 and may be movable from a first position to a second position to cut or shear the end portions 400, 402 of the covers 396, 398 from the remaining portions 404, 406 prior to or subsequent to welding. In embodiments where the covers 396, 398 are provided in the form of continuous ribbons, discrete end portions of the continuous ribbons may be inserted between the workpieces 338, 340 and the welding electrodes 326, 330 and cut from remaining portions of the continuous ribbons prior to or subsequent to welding (not shown). Depending upon the composition and microstructure of the steel workpieces 338, 340, in some embodiments a cover in the form of a continuous or discontinuous ribbon may be inserted between the first workpiece 338 and the first welding electrode 326, but not between the second workpiece 340 and the second welding electrode 330, or vice versa.

Figure 9:
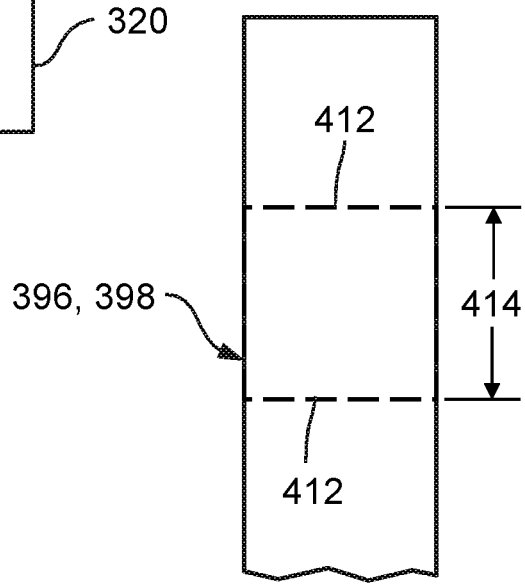
FIG. 9 is a schematic illustration of a cover comprising a perforated ribbon that may be used in connection with the resistance spot welding assembly of FIG. 8.

As shown in FIG. 9, one or both of the covers 396, 398 may comprise a perforated ribbon including multiple spaced-apart perforated seams 412, which may allow predetermined lengths 414 of the covers 396, 398 to be inserted between the workpieces 338, 340 and the welding electrodes 326, 330 and cut to shape, for example by the cutting members 408, 410, prior to or subsequent to welding.

The above description of preferred exemplary embodiments is merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of resistance spot welding overlapping steel workpieces, the method comprising:
    providing a workpiece stack-up comprising a first steel workpiece and a second steel workpiece that overlap each other at a weld site, the first steel workpiece having an exterior outer surface that provides a first side of the workpiece stack up and the second steel workpiece having an exterior outer surface that provides a second side of the workpiece stack-up, wherein at least one of the first and second steel workpieces comprises an advanced high-strength steel substrate having an ultimate tensile strength of greater than 550 MPa and a microstructure that includes greater than 5 vol % austenite, martensite, or bainite at ambient temperature;
    positioning the workpiece stack-up between a pair of opposed first and second welding electrodes such that a weld face of the first welding electrode faces toward the first side of the workpiece stack-up and a weld face of the second welding electrode faces toward the second side of the workpiece stack-up, and wherein a cover is disposed between at least one of the first steel workpiece and the first welding electrode or the second steel workpiece and the second welding electrode at the weld site;
    clamping the workpiece stack-up between the first and second welding electrodes at the weld site such that at least one of the weld faces of the first and second welding electrodes presses against the cover; and
    welding the first and second steel workpieces together by passing an electrical current between the first and second welding electrodes at the weld site,
    wherein the cover comprises an iron alloy having an ultimate tensile strength less than that of the advanced high-strength steel substrate.

2. The method set forth in claim 1 wherein the first steel workpiece comprises an advanced high-strength steel substrate having an ultimate tensile strength of greater than 550 MPa and a microstructure that includes greater than 5 vol % austenite, martensite, or bainite at ambient temperature, and wherein the workpiece stack-up is positioned between the opposed first and second welding electrodes such that the cover is disposed between the first steel workpiece and the first welding electrode at the weld site.

3. The method set forth in claim 1 wherein the second steel workpiece comprises an advanced high-strength steel substrate having an ultimate tensile strength of greater than 550 MPa and a microstructure that includes greater than 5 vol % austenite, martensite, or bainite at ambient temperature, and wherein the workpiece stack-up is positioned between the opposed first and second welding electrodes such that the cover is disposed between the second steel workpiece and the second welding electrode at the weld site.

4. The method set forth in claim 1 wherein both the first and second steel workpieces comprise an advanced high-strength steel substrate having an ultimate tensile strength of greater than 550 MPa and a microstructure that includes greater than 5 vol % austenite, martensite, or bainite at ambient temperature, and wherein the workpiece stack-up is positioned between the opposed first and second welding electrodes such that a first cover is disposed between the first steel workpiece and the first welding electrode and a second cover is disposed between the second steel workpiece and the second welding electrode at the weld site.

5. The method set forth in claim 1 wherein the advanced high-strength steel substrate has a surface coating that comprises a metal or metal alloy having a relatively low melting point, as compared to that of the advanced high-strength steel substrate.

6. The method set forth in claim 5 wherein the surface coating comprises zinc or a zinc-based alloy.

7. The method set forth in claim 1 wherein the advanced high-strength steel substrate comprises 3-100 vol % austenite at ambient temperature.

8. The method set forth in claim 1 wherein the advanced high-strength steel substrate has an ultimate tensile strength of greater than 780 MPa.

9. The method set forth in claim 1 wherein the advanced high-strength steel substrate comprises complex phase (CP), ferritic-bainitic (FB), martensitic (MS), hot formed (HF), press hardened (PHS), quenching and partitioning (Q&P), transformation induced plasticity (TRIP), or twinning induced plasticity (TWIP) steel.

10. The method set forth in claim 1 wherein the cover exhibits a microstructure that includes less than 5 vol % austenite at ambient temperature.

11. The method set forth in claim 1 wherein the microstructure of the cover at ambient temperature consists of ferrite or a combination of ferrite and pearlite.

12. The method set forth in claim 1 wherein the cover has a thickness less than that of the first and second steel workpieces.

13. The method set forth in claim 1 wherein the cover is disposed between at least one of the first steel workpiece and the first welding electrode or the second steel workpiece and the second welding electrode at the weld site by depositing a layer of a ferrous material on at least one of the exterior outer surface of the first steel workpiece or the exterior outer surface of the second steel workpiece.

14. The method set forth in claim 1 wherein the cover is inserted between at least one of the first steel workpiece and the first welding electrode or the second steel workpiece and the second welding electrode at the weld site prior to clamping the workpiece stack-up between the first and second welding electrodes.

15. The method set forth in claim 14 wherein, after the cover is inserted between at least one of the first steel workpiece and the first welding electrode or the second steel workpiece and the second welding electrode at the weld site, an end portion of the cover is severed from a remaining portion of the cover.

16. The method set forth in claim 15 wherein the end portion of the cover is severed from the remaining portion of the cover along a perforated seam.

17. The method set forth in claim 1 wherein a faying interface is established between each pair of adjacent overlapping steel workpieces within the workpiece stack-up at the weld site, and the overlapping steel workpieces are welded together by passing an electrical current between the first and second welding electrodes and across each faying interface at the weld site.

18. The method set forth in claim 1 wherein the first steel workpiece has a faying surface that overlaps and contacts a faying surface of the second steel workpiece to establish a single faying interface within the workpiece stack-up.

19. The method set forth in claim 1 wherein the workpiece stack-up further includes a third steel workpiece disposed between the first and second steel workpieces, the third steel workpiece having two opposed faying surfaces, wherein one faying surface of the third steel workpiece overlaps and contacts a faying surface of the first steel workpiece and the other faying surface of the third steel workpiece overlaps and contacts a faying surface of the second steel workpiece such that two faying interfaces are established within the workpiece stack-up.

20. The method set forth in claim 1 wherein the cover consists of steel having an ultimate tensile strength less than that of both the first and second steel workpieces.

* * * * *